United States Patent [19]

Jackson

[11] Patent Number: 4,561,955
[45] Date of Patent: Dec. 31, 1985

[54] COOLING ELECTRICAL APPARATUS

[76] Inventor: Graham Jackson, 35 Liffey Place, Woronora, New South Wales 2232, Australia

[21] Appl. No.: 626,314

[22] Filed: Jun. 29, 1984

[51] Int. Cl.[4] .................. C25B 15/08; C25D 21/02
[52] U.S. Cl. .................. 204/229; 204/239; 204/274
[58] Field of Search ........... 204/274, 241, 228–229, 204/239

[56] References Cited

U.S. PATENT DOCUMENTS 2,530,524  11/1950  Hlavin ........................ 204/229 X
4,119,517  10/1978  Hengst ........................ 204/229
4,171,256  10/1979  Themy ........................ 204/274 X Primary Examiner—Donald R. Valentine
Attorney, Agent, or Firm—Fitch, Even, Tabin & Flannery

[57] ABSTRACT

A power supply circuit containing a transformer which is used in a spray-drenched environment, for example, near a bathing pool or food processing plant, is cooled by heat exchange with circulating liquid. An electrolysis apparatus producing in situ chlorine for a pool has a passage through which pool water is pumped. A metal sleeve surrounds the passage and contacts a transformer and rectifier, all of which are surrounded by cast, insulating resin.

14 Claims, 4 Drawing Figures 4,561,955

COOLING ELECTRICAL APPARATUS

FIELD OF THE INVENTION

This invention concerns electrically powered liquid treatment or conveying apparatus which is located in proximity to the liquids which it processes or conveys and especially concerns a means of cooling the apparatus.

The invention will be described with particular reference to electrolysis cells for chlorinating swimming pools but will be appreciated by those conversant in the art that the invention is adaptable to the fishery industry, shipping, food processing generally and other situations, where electrical apparatus is used alongside water, brine and other solutions and ought, for safety reasons, to be isolated electrically from the liquids which they convey or treat.

BACKGROUND OF THE INVENTION

A particular problem attends electroylsis cells for swimming pools. Such cells require an integral transformer and rectifier in order to provide the low voltage DC for electrolysing the dilute salt solutions of the pool, whereby chlorine is liberated at the cell anode. The transformer operates at mains voltage and must therefore be shielded from the ingress of water.

The design of a shield for the transformer in particular poses problems. Firstly, the shield must be proof against rain, hose-directed water and the general spray of a swimming pool location. Secondly, the shield must be proof against the metal-corroding influence of brine in the pool. Thirdly, the shield must allow adequate cooling if the transformer is to have a commercially acceptable operating life. Fourthly, the shield must permit the dissipation of extra heat, such as solar heat.

One known salt water chlorinator relies upon an enamelled steel box to enclose the transformer, but the more waterproof the box, the higher the operating temperature tends to rise.

SUMMARY OF THE INVENTION

This invention provides electrically powered, liquid treatment apparatus containing a heat-producing electrical component which is required to be cooled during use in conjunction with circulating liquid to be treated, wherein the component is cooled by the liquid.

Preferably the apparatus is an electrolysis apparatus containing a power circuit which contains one or more components that is required to be cooled in use, and the circulating liquid is the electrolyte.

In one version of the invention, the apparatus has a passage through which the electrolyte flows when the apparatus is in use and the components or components is or are in heat exchange with the passage. Conveniently, the passage is in heat exchange with metal conductor and at least the main heat-producing components of the apparatus are in heat exchange with the conductor. The apparatus may have a flow-dependent switch arranged to interrupt the current to the transformer when the flow through the passage ceases or falls to a predetermined minimum.

DESCRIPTION OF THE DRAWINGS

A preferred embodiment of the invention will now be described by way of example with reference to the accompanying drawings in which.

DESCRIPTION OF THE EMBODIMENT

Figure 1:
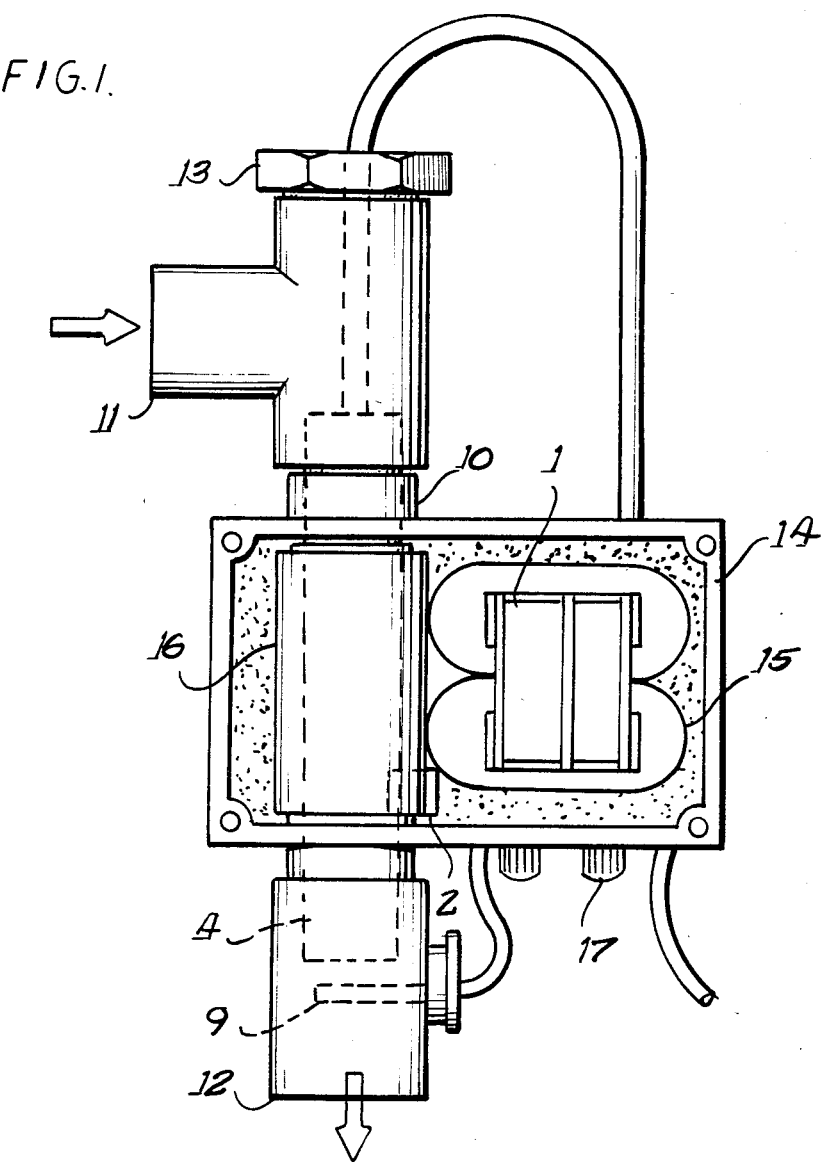
FIG. 1 is a diagram of the apparatus without the cover of the housing which contains the transformer and rectifier and FIG. 2 is a circuit diagram of the apparatus.
Figure 2:
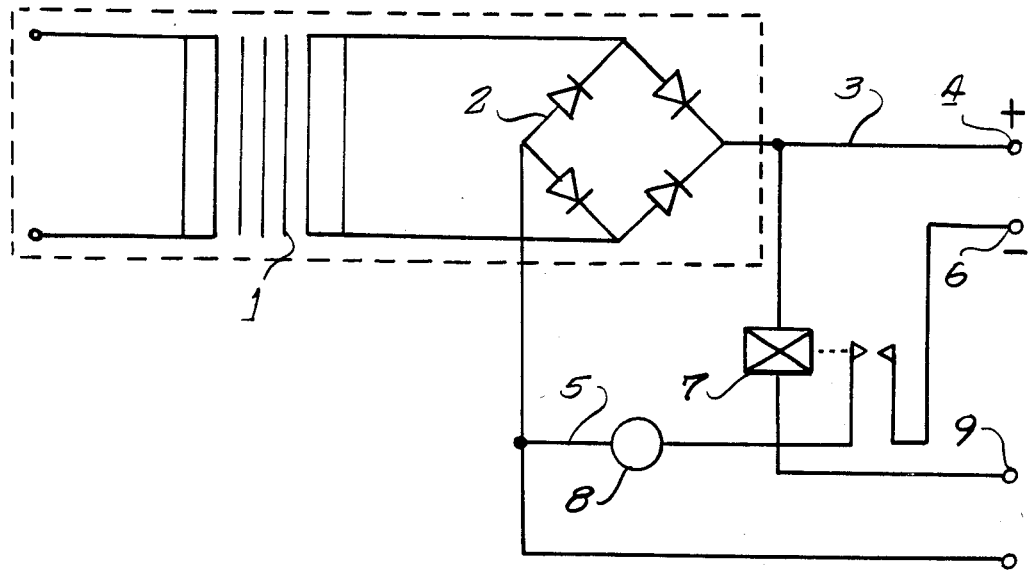

Referring now to the drawings, the pool water which contains salt in order to provide the chloride anion for chlorination is pumped through the apparatus by the filtration pump (not shown). The circuit diagram of FIG. 2 shows a transformer 1 whose primary winding receives mains voltage and whose secondary winding supplies 5.8 v to a bridge rectifier 2. The rectifier 2 is connected by a conductor 3 to the cell anode 4 and by a conductor 5 to the cathode 6 via switch 7 and ammeter 8, all connected in series.

The 6 v relay is connected in parallel to the bridge 2 but is interruptible by a flow-dependent switch 9.

The apparatus itself consists of a p.v.c. tube 10 with an inlet 11, an outlet 12, and a cap 13 which supports the removable anode 4 and cathode 6. A box 14 made of glass fibre-reinforced polyester surrounds the mid-portion of tube 10 and contains the transformer 1, the cores 15 of which are wedged against the aluminum sleeve 16 which is a slide fit on the tube 10. The rectifier 2 is mounted directly on sleeve 16. The space remaining in box 14 is filled with epoxy resin.

Terminals 17 on the box 14 allow the transformer 1 to supply electrodes 4,6. Flow-dependent switch 9 is located in the outlet 12.

The above-described embodiment cools the components more successfully than the best air ventilation could achieve in a small volume and with better insulation. If the pump fails, the flow-dependent switch opens and electrolysis ceases. Thus hydrogen and chlorine cannot accumulate.

Figure 3:
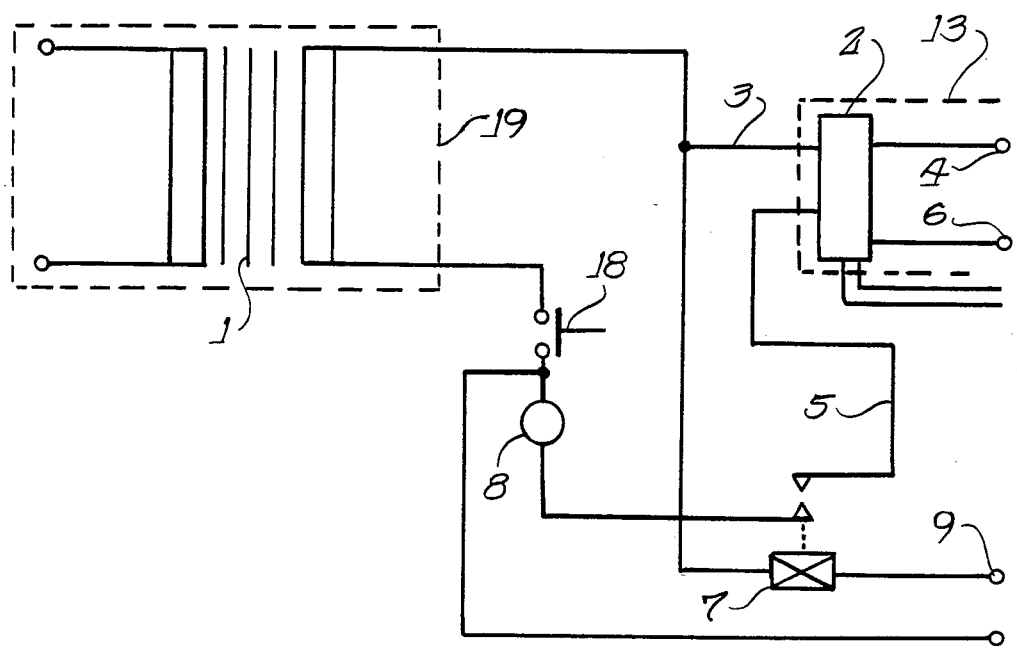
FIG. 3 is a circuit diagram of the apparatus indicating what parts are encapsulated and FIG. 4 is a diagrammatic section of the cap of the cell.
Figure 4:
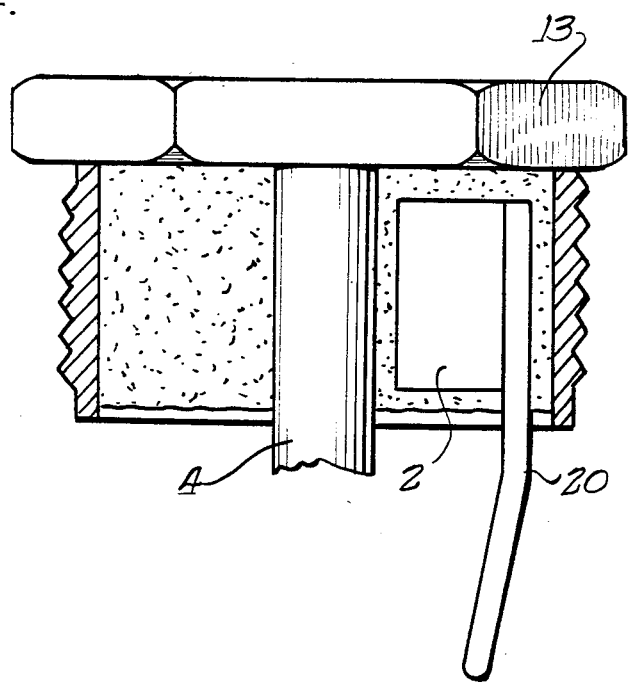

Referring now to FIG. 3, the circuit is essentially the same as that shown in FIG. 2 except for the provision of overload switch 18. The transformer 1 is encapsulated in its own box 14 and is intended to last the life of the apparatus, whereas the rectifier 2 may have a shorter life and is therefore physically separate from the box 14, being encapsulated in the cap 13 (see FIG. 4) fitted to the top of tube 10. The rectifier 2 is fixed in contact with a p.v.c.-coated aluminum strip 20 which, in use, projects axially down tube 10 in order to be cooled by the electrolyte rushing through tube 10. In the event of failure, the cap and rectifier are a cheap replacement.

I claim:
1. Electrolytic apparatus comprising
   an anode and a cathode,
   power supply circuit means including a rectifier for converting AC current to DC current, said rectifier being electrically connected to said anode and said cathode for supplying DC current thereto,
   means for exposing said anode and said cathode to an electrolyte,
   a fluid passage,
   pump means for circulating a portion of the electrolyte through said fluid passage, and
   a heat conducting member disposed in heat exchange relationship with said rectifer and extending into said fluid passage, whereby said flowing electrolyte acts to cool said rectifier, said heat-conducting member being a metal arm having means protecting its electrolyte-contacting surfaces from corrosion.

2. Apparatus according to claim 1 wherein a flow-dependent switch is disposed within said fluid passage and is connected to said power supply circuit means to cut off power to said anode and said cathode when electrolyte flow through said fluid passage ceases or falls to a predetermined minimum.

3. Apparatus according to claim 1 wherein said protecting means comprises a polymer coating on said metal arm.

4. Electrolytic apparatus comprising
an anode and a cathode
a power supply circuit means including a rectifier for converting AC current to DC current, said rectifier being electrically connected to said anode and said cathode for supplying DC current thereto,
means for exposing said anode and said cathode to an electrolyte,
a fluid passage,
pump means for circulating a portion of the electrolyte through said fluid passage, said fluid passage having an opening, and
a cap removably inserted in said opening to close the same, said rectifier being mounted in said removable cap in heat exchange relationship with the electrolyte with the electrolyte flowing through said fluid passage.

5. Apparatus according to claim 4 wherein a flow-dependent switch is disposed within said fluid passage and is connected to said power supply circuit means to cut off power to said anode and said cathode when electrolyte flow through said fluid passage ceases or falls to a predetermined minimum.

6. Apparatus according to claim 4 including a heat conducting member in heat exchange relationship with said rectifier and projecting into said fluid passage for transferring heat from said rectifier to electrolyte flowing through said fluid passage.

7. Apparatus according to claim 6 wherein said heat conducting member is formed of metal and has means protecting its electrolyte-contacting surfaces from corrosion.

8. Electrolytic apparatus comprising
an anode and a cathode,
power supply circuit means including a rectifier for converting AC current to DC current, said rectifier being electrically connected to said anode and said cathode for supplying DC current thereto,
a conduit of non-metallic material providing a fluid passage,
pump means for circulating electrolyte solution through said passage,
means mounting said anode and said cathode within said fluid passage of said conduit, and
metal sleeve meas disposed in surrounding contact with said conduit,
said rectifier being disposed in heat exchange relationship with said sleeve means for transferring heat generated in said rectifier through said sleeve means to the electrolyte flowing through said conduit.

9. Apparatus according to claim 8 wherein a flow-dependent switch is disposed within said fluid passage and is connected to said power supply circuit means to cut off power to said anode and said cathode when electrolyte flow through said fluid passage ceases or falls to a predetermined minimum.

10. Apparatus according to claim 8 wherein said rectifier and said sleeve means are embedded in a block of insulating resin.

11. Electrolytic apparatus comprising
an anode and a cathode,
power supply circuit means including a transformer for adjusting the voltage and current of AC power and a rectifier electrically connected to said transformer for converting said adjusted AC current to DC current, said rectifier being electrically connected to said anode and said cathode for supplying DC current thereto,
conduit of non-metallic material providing a fluid passage,
pump means for circulating an electrolyte solution through said passage,
means mounting said anode and said cathode within said fluid passage of said conduit, and
metal sleeve means disposed in surrounding contact with said conduit,
said transformer being disposed in heat exchange relationship with said metal sleeve means for transferring heat generated in said transformer through said sleeve means to the electrolyte flowing through said conduit.

12. Apparatus according to claim 11 wherein a flow-dependent switch is disposed within said fluid passage and is connected to said power supply circuit means to cut off power to said anode and said cathode when electrolyte flow through said fluid passage ceases or falls to a predetermined minimum.

13. Apparatus according to claim 11 wherein said rectifier is also disposed in heat exchange relationship with said sleeve means for transferring heat generated in said rectifer through said sleeve means to the electrolyte flowing through said conduit.

14. Apparatus according to claim 11 wherein said transformer and said sleeve means are embedded in a block of insulating resin.

* * * * *